United States Patent Office 3,300,417
Patented Jan. 24, 1967

3,300,417
POLYURETHANE PLASTICS
Wilbur R. McElroy, New Martinsville, W. Va., assignor to Mobay Chemical Company, Pittsburgh, Pa., a corporation of Delaware
No Drawing. Filed July 2, 1963, Ser. No. 292,452
12 Claims. (Cl. 260—2.3)

This application is a continuation-in-part of co-pending application Serial No. 68,643, now abandoned, filed November 14, 1960.

This invention relates to polyurethane plastics and, more particularly, to resins obtained from polyurethane plastics. The invention is particularly important for reclaiming scrap sometimes obtained in the production of finished articles from polyurethane plastics.

The solubilizing of polyurethane plastics in liquid linear polyesters, polyalkylene ether glycols and linear polyesteramides has been previously proposed in U.S. Patent 2,937,151. According to that process a mixture of, for example, a linear polyester and a cellular polyurethane plastic which has been obtained from a linear polyester and a polyisocyanate is heated to dissolve the cellular polyurethane. As this patent points out, temperatures above 250° C. result in discoloration of the resulting resin but if such temperatures are avoided, it is necessary to heat the polyurethane and resin for such long periods of time that the process is impractical commercially. Because this temperature is so near the decomposition temperature of the cellular polyurethane, the resulting mixture of resin and partially solubilized polyurethane often has a very dark brown color.

The main reason for wanting to solubilize the polyurethanes is to provide an economical means for polyurethanes plastic manufacturers and fabricators to dispose of scrap or waste material. If the waste, for example, can be liquefied, it can be used in the production of new polyurethane plastics right at the manufacturer's site. However, as pointed out above, since it has been necessary to heat the old polyurethane scrap to such a high temperature, the resulting liquid is often off-color, in many cases dark brown, and in consequence when the liquid is used to prepared new polyurethanes, the brown color persists, thus cheapening the product. Still further, commercialization of this earlier process has been hindered because of the long residence time required to bring about even partial solubilization of the polyurethane. As much time as an hour or even longer is required to even partially solubilize the polyurethane plastic. Of course, such a long time limits the process to batch operation and not continuous operation unless the excessively long residence time can be tolerated.

It is, therefore, an object of this invention to provide a simple, convenient and inexpensive method of at least partially solubilizing or liquefying a polyurethane plastic in a liquid resin. Another object of this invention is to provide a resin suitable for further reaction with chain-extenders and/or cross-linkers to prepare solid thermoplastic or thermoset compositions. Still a further object of this invention is to provide an improved method of reclaiming scrap polyurethane plastic. A further object of this invention is to provide an improved method of liquefying cellular polyurethane plastics based on polyhydric polyalkylene ethers and organic polyisocyanates in polyhydric polyalkylene ethers. A further object of this invention is to provide a catalyst for the liquefaction of polyurethane plastics based on polyhydric polyalkylene ethers and organic polyisocyanates in liquid resins. Still another object of this invention is to provide a method of reclaiming polyurethane plastics based on polyhydric polyalkylene ethers which are off specification. A further object of this invention is to provide a method of making improved cellular polyurethane plastics having a high content of reclaimed cellular polyurethane scrap.

The foregoing objects and others which will become apparent from the following description are accomplished in accordance with the invention, generally speaking, by providing resins obtained by liquefying a polyurethane plastic by heating the polyurethane in a liquid in the presence of a metal compound. The liquid is preferably a liquid resin and, most preferably an organic fluid which acts as a heat transfer medium in the presence of the metal catalyst which will cause dissociation of the urethane and/or urea groups. The organic fluid may be an organic compound substantially free of carboxylic acid groups, primary and secondary amino groups. This invention, therefore, provides, in a preferred embodiment, for the liquefaction of polyurethane plastics in an organic compound free of carboxylic acid groups and amino groups such as an hydroxyl polyester, polyhydric alcohols, polyhydric polyalkylene ethers, polyhydric polythioethers, hydrocarbons or the like. The resulting resin is suitable for the preparation of new polyurethane plastics. The invention, however, is not limited to the preparation of resins which are only suitable for the preparation of polyurethane plastics but may be used for the preparation of resins which are further reacted with polycarboxylic acids, epoxy compounds, bis-(anhydrides) such as pyromellitic anhydride, phosgene and the like to prepare compounds which may be used to prepare moldings, coatings and the like.

The solubilization of polyurethane plastics in accordance with the invention is carried out in a simple and convenient manner by heating the medium (i.e. organic compound as defined above) and polyurethane in the presence of a metal compound. Often, the polyurethane is advantageously cut, ground, or otherwise mechanically reduced or subdivided so that it will be solubilized faster by the resin. However, even where the polyurethane is not so treated the metal catalyst reduces the time necessary to obtain a liquid or at least fluidized material. The amount of time necessary to obtain complete solubilization varies somewhat from one system to another depending on the degree of cross-linking of the polyurethane plastic, the degree of subdivision, the temperature, the amount of agitation, the surface area and so forth. Where a high degree of cross-linking is present as in a rigid cellular polyurethane, the time necessary to cause the liquefaction may be as much as several hours depending on the degree of subdivision. Large pieces of material require considerable time to dissolve whereas smaller pieces, for example, those measuring less than about one inch in any direction through the center of the piece, will dissolve in a very short time. Where cellular polyether polyurethane plastics are to be dissolved, the time required for liquefaction will vary depending primarily on the wettability of the cellular polyether polyurethane. The best results are obtained by heating the medium and polyurethane to a temperature of at least about 125° C. and preferably at least about 190° C. Temperatures above 220° C. are seldom required and advantageously the process is carried out particularly for polyether polyurethanes at a temperature between about 190° C. and about 205° C.

Any suitable liquid, as more particularly pointed out above, may be used in accordance with the method of this invention. If water is used in the liquid state, it should be under sufficient pressure so that it will be liquid at a temperature of about 150° C. or more. It is also possible to use steam, however, since water will not react with the cellular polyurethane plastic, but in this event it is necessary to use a metal catalyst as more particularly set forth below in order to promote the degradation of the cellular polyurethane plastic.

Any suitable organic liquid may be used including hydrocarbons, chlorinated hydrocarbons, esters, ethers, thioethers, amides, ureas any of which may contain free hydroxyl groups or amino groups and which may be substituted with various substituents such as halogen, including chlorine, bromine, iodine, fluorine and the like as well as nitro groups and the like. Unless the organic compound contains free carboxyl groups or free primary or secondary amino groups, it will be necessary to have one of the metal catalysts present during the reaction or the reaction temperature will have to be above about 250° C. If the metal catalyst is used, a reaction temperature between about 150° C. and about 225° C. is usually sufficient to bring about at least partial dissolution of the milled cellular polyurethane plastic. Any suitable organic liquid of this type may be used such as, for example, benzene, naphthalene, toluene, hexane, heptane and the like, 4,4'-dichlorodiphenylmethane, o-dichlorobenzene, methylene chloride as well as other suitable resins including, for example, polyhydric alcohols, polyhydric polyalkylene ethers, hydroxyl polyesters, polyhydric polythioethers and the like. These compounds preferably have a molecular weight of at least about 500 and hydroxyl numbers within the range of from about 25 to about 600. They are preferably liquid at room temperature. Any suitable polyhydric polyalkylene ether may be used such as, for example, the condensation product of an alkylene oxide or of an alkylene oxide with a polyhydric alcohol. Any suitable polyhydric alcohol may be used such as those disclosed below for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols, and the like. It is often advantageous to employ some trihydric or higher polyhydric alcohol such as glycerine, trimethylolpropane, pentaerythritol, and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, vol. 7, pages 257–262, published by Interscience Publishers, Inc. (1951), or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

Any suitable hydroxy polyester may be used such as are obtained for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha-beta-diethylsuccinic acid, isophthalic acid, terephthalic acid, hemimellitic acid, trimellitic acid, trimesic acid, mellophanic acd, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylolpropane, 1,3,6-hexanetriol, triethanolamine, pentaerythritol, sorbitol and the like.

The invention is most applicable to the preparation of resins from cellular polyurethane plastics and polyhydric polyalkylene ethers since it is here that the catalyst exerts the greatest effect and the polyurethane may be liquefied in the shortest amount of time. Moreover, in accordance with a preferred embodiment of this invention, a cellular polyurethane plastic is passed through a rubber mill and is then combined with a mixture of a hot polyhydric polyalkylene ether and a tin catalyst. The mixture of tin catalyst and polyhydric polyalkylene ether is preferably heated to a temperature within the range of from about 190° C. to about 220° C. for a period of time, preferably at least about 5 minutes, until the polyurethane becomes liquefied.

Any suitable metal catalyst may be used to promote the degradation of the cellular polyurethane plastic. The preferred catalysts are compounds having the formula:

$$Me(OR)_m X_{n-m}$$

wherein Me is a metal having an atomic number of from 21 to 92 and preferably from 21 to 83, R is an organic radical, n is the valence of the metal Me, m is 0 or a positive integar at most equal to the valence of the metal and X is alkyl, aryl, cycloalkyl, heterocyclic, halogen, oxygen, nitrate, nitrite, sulfate, sulfite, carbonate, phosphate, stannate, arsenate, organic carboxylate, hydroxy, amide, borate and the like. Suitable compounds are therefore scandium nitrate, titanium acetyl acetonate, vanadium acetyl acetonate, chromium acetyl acetonate, manganous cetyl acetonate, iron acetyl acetonate, cobalt oxide, nickel acetyl acetonate, copper acetyl acetonate, zinc acetyl acetonate, aluminum acetyl acetonate, bismuth stannate, bismuth nitrate, thorium acetyl acetonate, arsenic triiodide, molybdenum pentachloride, uranyl acetate, copper nitite, stannous sulfate, nickel sulfite, strontium carbonate, zinc phosphate, nickel arsenite, nickel arsenate, copper hydroxide, methyl triborine triamine, copper borate and the like. The preferred metal catalysts are the tin compounds.

Any suitable tin compound may be used including stannous chloride, dialkyl tin chlorides, dialkyl tin oxides, trialkyl tin oxides, dialkyl tin sulfides, dialkyl tin dialkoxides, alkyl tin trialkoxide, dialkyl tin diphenates, alkyl tin triphenates, dialkyl tin dinaphthanates, alkyl tin trinaphthanates, alkyl tin trihalides, trialkyl tin halides, stannous salts of carboxylic acids, dialkyl tin salts of carboxylic acids, and the like. Specific examples include stannous octoate, stannous oleate, stannous stearate, stannous acetate, stannous adipate, stannous maleate, stannous succinate, di(2-ethyl hexyl) tin oxide, dibutyl tin oxide, dioctyl tin oxide, diethyl tin oxide, dipropyl tin oxide, diisopropyl tin oxide, dibutyl tin diacetate, dibutyl tin diformate, dipropyl tin diacetate, diisopropyl tin diacetate, dipropyl tin dioleate, dipropyl tin dipropionate, dibutyl tin di(2-ethyl hexoate), dimethyl tin adipate, dibutyl tin maleate, dibutyl tin succinate, dimethyl tin sulfide, diethyl tin sulfide, methyl ethyl tin sulfide, dipropyl tin sulfide, methyl propyl tin sulfide, diisopropyl tin sulfide, dibutyl tin sulfide, ethyl butyl tin sulfide, dioctyl tin sulfide, methyl octyl tin sulfide, diheptyl tin sulfide, dihexadecyl tin sulfide, dioctadecyl tin sulfide, dimethyl tin dimethoxide, dimethyl tin diethoxide, dibutyl tin dibutoxide, dimethyl tin dibutoxide, ethyl tin tributoxide, heptadecyl tin tributoxide, octadecyl tin trimethoxide, amyl tin triethoxide, dibutyl tin bis-(o-phenyl phenate), dimethyl tin bis-(o-phenyl phenate), diethyl tin bis-(o-phenyl phenate), diamyl tin bis-(o-naphthyl naphthanate), butyl tin tri-(o-phenyl phenate), cyclohexyl tin bis-(o-phenyl phenate), tributyl tin chloride, dibutyl tin dichloride, butyl tin trichloride, trimethyl tin chloride, dimethyl tin dichloride, methyl tin trichloride, triethyl tin bromide, tributyl tin iodide, trioctyl tin chloride, diamyl tin diiodide, amyl tin triiodide, hexyl tin trichloride, tripropyl tin fluoride, triisopropyl tin chloride, triisobutyl tin chloride, diheptyl tin dichloride, nonyl tin trichloride, tetra m-xylyl tin, tetracyclohexyl tin, di-beta-furfuryl tin and the like.

In accordance with a preferred embodiment of this invention cellular polyether polyurethanes are liquefied in a polyhydric polyalkylene ether and then the resulting resin is reacted with an organic polyisocyanate in the presence of a blowing agent to prepare a new cellular polyether polyurethane. As previously stated, this process is very important because one may thereby economically dispose of scrap material. Since the use of a metal compound as a catalyst lowers the temperature at which the solid polyurethane will become liquid enough to be further reacted with organic polyisocyanates in the presence of a blowing agent, the color of the resulting resin and consequently the new cellular polyurethane is considerably improved. In practice, the amount of polyurethane which can be solubilized in the resin is dependent on the viscosity of the resulting material. Usually up to about 1000 percent by volume or about 30 percent by weight of the cellular polyurethane can be mixed into the liquid resin based on the weight of the resin. In most cases manufacturers can include up to 10 percent by weight of polyurethane in the resin and thus use all of the waste material they have. Since the process of solubilization can be carried out at a low temperature in a short period of time, often less than 10 minutes, the invention is particularly important for this process.

Any suitable organic polyisocyanate may be used for the preparation of either the original polyurethane plastic which results in scrap or waste used in the process of the invention or for the production of new polyurethane plastics from the resin containing the old polyurethane resin solubilized therein including for example, aromatic, aliphatic and heterocyclic polyisocyanates. In other words, two or more isocyanate radicals may be bonded to any suitable divalent or higher polyvalent organic radical to produce the organic polyisocyanates which are useful in accordance with the present invention including acyclic, alicyclic, aromatic and heterocyclic radicals. Suitable organic polyisocyanates are, therefore, ethylene diisocyanate, ethylidene diisocyanate, propylene-1,2-diisocyanate, cyclohexylene-1,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl - 4,4'-biphenylene diisocyanate, 4,4'-biphenylene diisocyanate, 3,3' - dichloro-4,4' - biphenylene diisocyanate, p,p',p''-triphenylmethane triisocyanate, 1,5-naphthalene diisocyanate, furfurylidene diisocyanate or polyisocyanates in a blocked or inactive form such as the bis-phenyl carbamates of 2,4- or 2,6-toluylene diisocyanate, p,p'-diphenylmethane diisocyanate, p-phenylene diisocyanate, 1,5-naphthalene diisocyanate and the like. It is preferred to use the commercially available mixture of toluylene diisocyanate which contains 80 percent 2,4-toluylene diisocyanate and 20 percent 2,6-toluylene diisocyanate or 4,4'-diphenylmethane diisocyanate.

Any suitable blowing agent may be used such as, for example, water, halohydrocarbons, such as, for example, dichlorodifluoromethane, trichlorofluoromethane and the like.

It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Patent 2,834,748. Where polyhydric polyalkylene ethers are included in the reaction mixture to prepare a cellular polyurethane plastic, it is preferred to employ a silicone oil of the above patent within the scope of the formula:

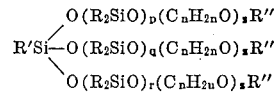

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula:

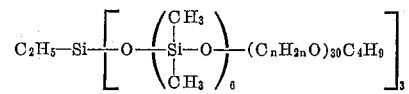

wherein $(C_nH_{2n}O)$ is a mixed polyoxyethylene and oxypropylene block copolymer containing about 17 oxyethylene units and about 13 oxypropylene units.

It is preferred to include a catalyst in the reaction mixture leading to the production of the cellular polyurethane plastics. Suitable catalysts are, for example, triethylene diamine, N-methyl morpholine, N-ethyl morpholine, diethyl ethanolamine, N-coco morpholine, 1-methyl-4 - dimethylamino ethyl piperazine, 3 - methoxy-N-dimethyl propyl amine, N-dimethyl-N'-methyl isopropyl propylene diamine, dimethyl benzyl amine and the like. Other suitable catalysts are, for example, tin compounds such as, dibutyl tin di-2-ethyl hexoate, stannous octoate, as well as other organo metallic compounds such as are disclosed in U.S. Patent 2,846,408.

Other new polyurethanes may be prepared in accordance with previously disclosed processes including the preparation of castings, moldings, coatings and the like as disclosed for example in U.S. Patents 2,621,166, 2,729,618 and 2,948,691.

The utility of polyurethane plastics is well known and the resins prepared according to this invention may be used for the production of polyurethane plastics including both cellular and noncellular polyurethane plastics which may in turn be used for the production of thermal and sound insulation, castings, such as bearings, gear wheels and the like.

The invention is further illustrated by the following examples in which the parts are by weight unless otherwise indicated.

*Example 1*

(a) A cellular polyurethane plastic is prepared as follows: About 100 parts of a trihydric polyalkylene ether prepared from about 1 part of glycerine and about 30 parts of propylene oxide by condensation thereof to a molecular weight of about 3000 and having an hydroxyl number of about 56 are mixed with about 40 parts of a mixture of 80 percent 2,4- and 20 percent 2,6-toluylene diisocyanate, about 0.35 part of stannous octoate, about 0.35 part N-ethyl morpholine, about 0.05 part of 1-methyl-4-dimethyl amino ethyl piperazine, about 1 part of a silicone oil having the formula:

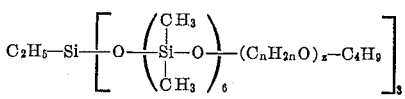

wherein $(C_nH_{2n}O)$ represents about 17 oxyethylene units and about 13 oxypropylene units and $z$ is equal to about 30 are also mixed with the other ingredients substantially simultaneously and about 3.2 parts of water are mixed in an injection mixer as described in U.S. Reissue Patent 24,514. The resulting celular polyurethane plastic has the following physical properties:

Density _____ lbs./ft.³__ 2
Tensile strength _____ lbs./in.²__ 17
Elongation _____ percent__ 280

(b) About 100 parts of a trihydric polyalkylene ether obtained from the condensation of about 1 part of glycerine with about 30 parts of propylene oxide condensed to a molecular weight of about 3000 and having an hydroxyl number of about 56 are placed in a resin kettle, blanketed with nitrogen and about 5 parts of the cellular polyurethane plastic prepared in Example 1(a) together with about 0.5 part of stannous octoate are added and the temperature is gradually increased to about 200° C. At temperatures below about 190° C. there is no appreciable change in the cellular polyurethane plastic. Above about 190° C. the cellular polyurethane plastic, which originally is reduced to about 1 x 1 x 10 centimeters, appears to be dissolved in the polyhydric polyalkylene ether. The resulting resin is a buff color and has an hydroxy number of about 61.3 and a viscosity at about 25° C. of about 835 centipoises. When this mixture of apparently dissolved cellular polyurethane plastic and polyether are reacted with a mixture of about 40 parts of 80 percent 2,4- and 20 percent 2,6-toluylene diisocyanate and about 3.2 parts of water, a cellular polyurethane plastic is obtained which has a density of about 2 lbs./ft.$^3$ and good physical properties.

(c) Example 1(b) is repeated except that the stannous octoate is not included. After about two hours of heating to a temperature above about 190° C., there is no apparent solution of the cellular polyurethane plastic. Moreover, the polyether becomes a very dark brown.

*Example 2*

(a) About 100 parts of the trihydric polyalkylene ether employed in Example 1(b) are placed in a resin kettle with about 5 parts of the cellular polyurethane plastic prepared in Example 1(a), the cellular polyurethane plastic having been reduced to pieces about 1 x 1 x 10 centimeters. About 1 part of stannous oleate is added and the mixture is thoroughly stirred and heated to a temperature of about 200° C. Ten minutes after the mixture has reached a temperature of about 200° C. an apparent solution of the cellular polyurethane plastic in the resin occurs. When about 100 parts of the resulting liquid mixture are combined with about 40 parts of a mixture of 80 percent 2,4- and 20 percent 2,6-toluylene diisocyanate and about 3.2 parts of water, a cellular polyurethane plastic having a density of about 3 lbs./ft.$^3$ and good physical properties is obtained.

(b) When the charge to the resin kettle in Example 2(a) is the same except that oleic acid is used instead of stannous oleate, no solution can be obtained even though the mixture is heated to about 200° C. which demonstrates that the tin in stannous oleate accounts for the partial solution of the cellular polyurethane plastic in the polyether.

*Example 3*

(a) About 100 parts of the trihydric polyalkylene ether employed in Example 1(b) are mixed with about 0.3 part stannous octoate and heated to a temperature of about 200° C. Then about 25 parts of the cellular polyurethane plastic prepared in Example 1(a) which has been cut into pieces about 4 x 4 x 4 inches is added thereto. The temperature is maintained at about 200° C. for about 45 minutes to about 1 hour. The mixture is blanketed with nitrogen throughout. Partial solution of the cellular polyurethane plastic in the trihydric polyalkylene ether takes place after about 45 minutes. The resulting resin has a viscosity of about 6300 cps./25° C. and an hydroxyl number of about 60.5. The resin is light yellow in color.

(b) about 50 parts of the resin obtained in Example 3(a) are blended with about 50 parts of a trihydric polyalkylene ether prepared by the condensation to a molecular weight of about 3000 and an hydroxyl number of about 56 of one part glycerine with about 30 parts propylene oxide. This blend is then mixed with about 40 parts of a mixture of 80 percent 2,4- and 20 percent 2,6-toluyl-ene diisocyanate, about 0.35 part of stannous octoate, about 0.35 part of N-ethyl morpholine, about 0.05 part of 1-methyl-4-dimethyl amino ethyl piperazine, about 1 part of the silicone oil employed in Example 1(a) and about 3.2 parts of water with an injection mixer as described in U.S. Reissue Patent 24,514. The components are thoroughly mixed and placed in a mold. The resulting cellular polyurethane plastic which has the following physical properties is obtained:

| | |
|---|---|
| Density _____lbs./ft.$^3$__ | 2 |
| Tensile strength _____lbs./in.$^2$__ | 17 |
| Elongation _____percent__ | 280 |
| Tear strength _____lbs./in.__ | 2.1 |
| Compression deflection, p.s.i. 25%/25% R _____ | .28/.24 |

*Example 4*

(a) About 100 parts of the polyether employed in Example 1(b) are mixed with about 1 part of stannous oleate and placed in a resin kettle. The mixture is heated to about 200° C. and about 20 parts of the cellular polyurethane plastic prepared in Example 1(a) which has been cut into pieces about ¼ inch on an edge are added. The resulting mixture is maintained at a temperature of about 200° C. under a nitrogen blanket and within about 20 minutes an apparent solution yielding a yellow resin having an hydroxyl number of about 64.3 is obtained.

(b) about 100 parts of the resin prepared in Example 4(a) are mixed with about 42 parts of a mixture of 80 percent 2,4- and 20 percent 2,6-toluylene diisocyanate, about 0.6 part of stannous oleate, about 1 part of N-ethyl morpholine, about 0.1 part of 1-methyl-4-dimethyl amino ethyl piperazine, about 1 part of the silicone oil employed in Example 1(a) and about 3.2 parts of water on a machine mixer as disclosed in U.S. Reissue Patent 24,514 and discharged into a mold. The resulting cellular polyurethane plastic has the following physical properties:

| | |
|---|---|
| Density _____lbs./ft.$^3$__ | 1.86 |
| Tensile strength _____lbs./in.$^2$__ | 12.9 |
| Elongation _____percent__ | 165 |
| Tear strength _____lbs./in.__ | 2 |
| Compression deflection, p.s.i. 25%/25% R ____ | .30/.25 |

*Example 5*

(a) A polyester having a molecular weight of about 2,000, an hydroxyl number of about 56 and an acid number of less than about 1 is prepared by condensing about 1 mol of adipic acid with about 1.09 mols of ethylene glycol at a temperature of about 200° C. for about 35 hours. About 100 parts of the polyester are dehydrated by heating to temperature of about 125° C. for about 1 hour and then mixed with about 9 parts of 1,4-butane diol at about 65° C. and then about 40 parts of 4,4'-diphenyl-methane diisocyanate are added and when the ingredients have been thoroughly mixed, the resulting mixture is poured onto a metal table heated to about 110° C. The elastomeric mixture is allowed to remain on the table for about 10 minutes and then it is removed and allowed to cool to room temperature. The resulting sheet-like product is ground in a Ball and Jewell grinder.

(b) About 100 parts of the polyester used in Example 5(a) are reacted with about 40 parts of 4,4'-diphenyl-methane diisocyanate at a temperature of about 125° C. to prepare an isocyanate-modified polyesters having about 6.5 percent—NCO available for further reaction. This isocyanate-modified polyester is then mixed with about 9 parts of 1,4-butane diol and cast in a mold. A solid casting is obtained.

(c) About 100 parts of the trihydric polyalkylene ether employed in Example 1(a) are heated to a temperature of about 205° C. and about 26 parts of the ground, substantially nonporous polyurethane plastic prepared in Example 5(a) are added. The resulting mixture is maintained at a temperature of about 205° C. for more than 10 minutes and there is no apparent solution of the polyurethane plastic. When about 0.6 part of stannous octoate is added, the polyurethane immediately begins to liquefy and is completely liquefied in about 10 minutes.

(d) Example 5(c) is repeated except that about 26 parts of the substantially nonporous polyurethane plastic prepared in Example 5(b) are used. Again there is no apparent solution in the absence of stannous octoate and the polyurethane plastic beings to dissolve immediately after the addition of 0.6 part of stannous octoate and is completely liquefied in about 10 minutes.

*Example 6*

(a) A blend of polyesters one of which is obtained by the condensation of adipic acid and diethylene glycol and the other of which is obtained by the condensation of adipic acid, diethylene glycol and trimethylol propane to a molecular weight of about 2,000 is prepared. The composite hydroxyl number of the blend of polyesters is about 52, acid number of the blend is less than about two and the viscosity is about 800 cps./25° C. About 100 parts of this blend of polyesters are mixed with about 40 parts of a mixture of 80 percent 2,4- and 20 percent 2,6-toluylene diisocyanate, about 2.5 parts of N-ethyl morpholine, about 1 part of diethylamine oleate, about 1.7 parts of water and about 3 parts of sulphonated castor oil which contains about 53 weight percent water with a machine mixer as disclosed in U.S. Reissue Patent 24,514. The reaction mixture is discharged into mold where it reacts and expands to form a cellular polyurethane plastic which has a density of about 2 lbs./ft.³.

(b) About 100 parts of the trihydric polyalkylene ether employed in Example 1(b) are mixed with about 0.3 part of stannous octoate and heated to a temperature of about 200° C. About 20 parts of the cellular polyurethane plastic prepared in Example 6(a) which has previously been reduced to pieces about four inches by one half inch by one half inch is added to the hot polyether and immediately begins to go into solution. After about 30 minutes all of the cellular polyurethane plastic has been added and is apparently solubilized.

(c) Following the procedure of Example 2(b) except that the blend of polyeters employed in Example 6(a) is mixed with stannous octoate and heated to a temperature of about 200° C., the cellular polyurethane is again apparently dissolved in about 30 minutes.

(d) Following the procedure of Example 6(c) except that dibutyl tin di-2-ethyl hexoate is used instead of stannous octoate, esssentially the same results are obtained.

*Example 7*

About 100 parts of the trihydric polyalkylene ether employed in Example 1(b) are mixed with about 0.3 part of the metallic compounds listed below and heated to a temperature of about 200° C. Then about 5 parts of the cellular polyurethane plastic prepared in Example 1(a) are added with agitation and maintained at this temperature until apparent solution of the cellular polyurethane in the trihydric polyalkylene ether. The time necessary to achieve at least partial solubilization and complete liquefaction of the cellular polyurethane plastic is shown below:

| Catalyst: | Time/minutes |
|---|---|
| Copper acetyl acetonate | 10 |
| Chromium acetyl acetonate | 10 |
| Manganese acetyl acetonate | 15 |
| Zinc acetyl acetonate | 10 |
| Cobalt acetyl acetonate | 10 |
| Titanium acetyl acetonate | 10 |
| Iron acetyl acetonate | 10 |
| Thorium acetyl acetonate | 15 |
| Nickel acetyl acetonate | 10 |
| Vanadium acetyl acetonate | 10 |
| Zirconium acetyl acetonate | 10 |
| Aluminum acetyl acetonate | 15 |
| Bismuth stannate | 20 |
| Zinc nitrate | 25 |
| Lead acetate | 10 |
| Cobalt oxide | 35 |
| Chromium nitrate | 15 |
| Lead octoate | 5 |

*Example 8*

(a) A cellular polyurethane plastic is prepared as follows: About 100 parts of a trihydric polyalkylene ether prepared from about 1 part of glycerine and about 30 parts of propylene oxide by condensation thereof to a molecular weight of about 3000 and having an hydroxyl number of about 56 are mixed with about 40 parts of a mixture of 80 percent 2,4- and 20 percent 2,6-toluylene diisocyanate, about 0.35 part of stannous octoate, about 0.35 part N-ethyl morpholine, about 0.05 part of 1-methyl-4-dimethyl amino ethyl piperazine, about 1 part of a silicone oil having the formula:

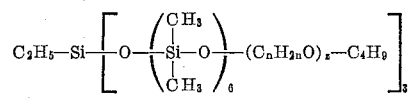

wherein $(C_nH_{2n}O)$ represents about 17 oxyethylene units and about 13 oxypropylene units and $z$ is equal to about 30 are also mixed with the other ingredients substantially simultaneously, and about 3.2 parts of water are mixed in an injection mixer as described in U.S. Reissue Patent 24,514. The resulting cellular polyurethane plastic has the following physical properties:

| | |
|---|---|
| Density lbs./ft.³ | 2 |
| Tensile strength lbs./in.² | 17 |
| Elongation percent | 280 |

(b) About 100 parts of a trihydric polyalkylene ether prepared from about 1 part of glycerine and about 30 parts of propylene oxide by condensation thereof to a molecular weight of about 3000, said trihydric polyalkylene ether having an hydroxyl number of about 56 are mixed with about 0.3 part of stannous octoate in a resin kettle and heated to about 200° C. About 21 parts of the cellular polyurethane plastic prepared in Example 1(a) which has previously been subdivided by passing it through a two-roll roller mill, one roll of which is rotating at a velocity of about 30 r.p.m. and the other at about 36 r.p.m., are slowly added to the hot mixture. Only about 7 minutes are required for the addition and complete liquefaction of the milled cellular polyurethane plastic. The resulting resin has a viscosity of about 4825 cps./25° C.

(c) About 100 parts of the resin prepared in Example 1(b) are reacted with about 40 parts of a mixture of 80 percent 2,4- and 20 percent 2,6-toluylene diisocyanate and about 3.2 parts of water in a machine mixer as disclosed in U.S. Reissue Patent 24,514 to prepare a cellular polyurethane plastic which has a density of about 1.8 lbs./ft.³ and good physical properties.

*Example 9*

(a) About 100 parts of the trihydric polyalkylene ether employed in Example 1(b) are heated in a resin kettle to a temperature of about 200° C. and mixed with about 0.3 part of stannous octoate. About 25 parts of the cellular polyurethane plastic prepared in Example 1(a) which has previously been subdivided by passing it through the roller mill of Example 1(b). The milled cellular polyurethane plastic can be added to the trihydric polyalkylene ether and completely liquefied in less than about 15 minutes.

(b) About 50 parts of the resin obtained in Example 2(a) are blended with about 50 parts of the trihydric polyalkylene ether employed in Example 1(b) and the blend is mixed with about 41 parts of a mixture of 80 percent 2,4- and 20 percent 2,6-toluylene diisocyanate, about 0.35 part of stannous octoate, about 0.35 part of N-ethyl morpholine, about 0.05 part of 1-methyl-4-dimethyl amino ethyl piperazine, about 1 part of the silicone oil used in Example 1(a) and about 3.2 parts of water on a machine mixer as disclosed in U.S. Reissue Patent 24,514. The resin blend is added to the mixture at a temperature of about 25° C. and at a rate of about 6750 grams per minute. The agitator speed on the machine is about 5000 r.p.m. The mixture is expelled from the machine into the mold and assumes a creamy appearance, i.e. gas bubbles begin to form in about 8 seconds. The foaming reaction is completed in about 70 seconds and a cellular polyurethane plastic is obtained which has the following physical properties:

| | |
|---|---|
| Density _____ lbs./ft.$^3$ | 1.7 |
| Tensile strength _____ lbs./in.$^2$ | 21.7 |
| Elongation _____ percent | 310 |
| Tear strength _____ lbs./in. | 2.6 |
| Compression deflection, 25%/25% R | .41/.35 |

It is to be understood that any other suitable resin, tin catalyst, organic polyisocyanate or the like employed in the preceding examples could have been substituted with others in accordance with the foregoing disclosure.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method of liquefying a solid polyurethane plastic which comprises heating said polyurethane plastic in a hot liquid capable of dissolving solid polyurethane in the presence of a metal compound catalyst selected from the group consisting of a tin compound, copper acetyl acetonate, chromium acetyl acetonate, manganese acetyl acetonate, zinc acetyl acetonate, cobalt acetyl acetonate, titanium acetyl acetonate, iron acetyl acetonate, thorium acetyl, nickel acetyl acetonate, vanadium acetyl acetonate, zirconium acetyl acetonate, aluminum acetyl acetonate, bismuth stannate, zinc nitrate, lead acetate, cobalt oxide, chromium nitrate and lead octoate until said solid polyurethane plastic is at least partially liquefied.

2. The method of claim 1 wherein said hot liquid is a hot liquid resin.

3. In a process for solubilizing a solid polyurethane plastic in a liquid selected from the group consisting of hydroxyl polyesters obtained by a processs which comprises condensing a polycarboxylic acid with a polyhydric alcohol, polyhydric polyalkylene ethers and polyhydric polythioethers, by a process which comprises heating a mixture of said polyurethane plastic and said liquid until at least partial solubilization of the polyurethane in the liquid, the improvement which comprises mixing said liquid with a catalytic amount of a tin compound and heating the resulting mixture with said solid polyurethane plastic.

4. In a process for solubilizing a solid polyurethane plastic in a polyhydric alcohol by a process which comprises heating a mixture of said polyurethane plastic and said polyhydric alcohol until at least partial solubilization of the polyurethane in the polyhydric alcohol, the improvement which comprises mixing said polyhydric alcohol with a catalytic amount of a tin compound and heating the resulting mixture with said solid polyurethane plastic.

5. In a process for solubilizing a solid polyurethane plastic in an organic compound by a process which comprises heating a mixture of said solid polyurethane plastic and said organic compound until at least partial solubilization of the polyurethane, the improvement which comprises mixing an organic compound free of carboxylic acid groups, primary and secondary amino groups with a catalytic amount of a tin compound, heating the resulting mixture to a temperature of at least about 125° C. and adding a solid polyurethane plastic to the hot mixture.

6. In a process for solubilizing a cellular polyurethane plastic by a process which comprises heating an organic compound selected from the group consisting of hydroxyl polyesters obtained by a process which comprises condensing a polycarboxylic acid with a polyhydric alcohol, polyhydric polyalkylene ethers and polyhydric polythioethers until at least partial solubilization of the polyurethane therein, the improvement which comprises mixing said organic compound with a catalytic amount of a tin compound, heating the resulting mixture to a temperature of at least about 125° C., adding the cellular polyurethane plastic thereto and maintaining the temperature above about 125° C. until at least partial solubilization of said cellular polyurethane plastic is effected.

7. The method of claim 5 wherein said organic compound contains hydroxyl groups.

8. The method of claim 5 wherein said organic compound and tin compound catalyst are mixed and heated to a temperature of at least about 190° C. and then the solid polyurethane plastic is added.

9. A method of partially solubilizing a cellular polyether polyurethane plastic which comprises heating a mixture of a polyhydric polyalkylene ether and a catalytic amount of a tin compound to a temperature of at least about 190° C., thereafter placing the cellular polyether polyurethane in said heated mixture and maintaining the temperature thereof above about 190° C. until at least partial solubilization of said cellular polyether polyurethane in said polyhydric polyalkylene ether is effected.

10. A method of liquefying solid cellular polyurethane plastics which comprises passing a cellular polyurethane plastic prepared by a process which comprises reacting an organic polyisocyanate with a polyhydric polyalkylene ether in the presence of a blowing agent through a roller mill to cause subdivision thereof and thereafter placing the subdivided cellular polyurethane plastic in a liquid polyhydric polyalkylene ether mixed with an organo tin compound and heating the resulting mixture to a temperature above about 190° C. and continuing to heat the mixture until said cellular polyurethane is liquid.

11. The method of claim 10 wherein said organo tin catalyst is stannous octoate.

12. A method of liquefying a solid polyurethane plastic which comprises heating said polyurethane plastic in a hot liquid capable of dissolving said polyurethane in the presence of an organo tin catalyst until said solid polyurethane plastic is at least partially liquefied.

References Cited by the Examiner

UNITED STATES PATENTS

| | | | |
|---|---|---|---|
| 2,686,162 | 8/1954 | Hensley et al. | 260—2.3 |
| 2,937,151 | 5/1960 | Ten Broeck et al. | 260—2.5 |
| 3,109,824 | 11/1963 | Heiss | 260—2.3 |
| 3,117,940 | 1/1964 | McElroy | 260—2.3 |
| 3,123,577 | 3/1964 | Heiss | 260—2.3 |

FOREIGN PATENTS 805,561  12/1958  Great Britain.

MURRAY TILLMAN, *Primary Examiner.*

W. L. BASCOMB, D. J. BREZNER,
*Assistant Examiners.*